(12) United States Patent
Teague et al.

(10) Patent No.: US 11,953,581 B2
(45) Date of Patent: Apr. 9, 2024

(54) ADAPTIVE CELL DEPTH CONTOUR BEAMS

(71) Applicant: Rockwell Collins, Inc., Cedar Rapids, IA (US)

(72) Inventors: Jacob G. Teague, West Melbourne, FL (US); Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 138 days.

(21) Appl. No.: 17/503,892

(22) Filed: Oct. 18, 2021

(65) Prior Publication Data

US 2023/0119497 A1  Apr. 20, 2023

(51) Int. Cl.
  *G01S 13/12* (2006.01)
  *G01S 7/282* (2006.01)
  *G01S 13/89* (2006.01)

(52) U.S. Cl.
  CPC .............. *G01S 13/12* (2013.01); *G01S 7/282* (2013.01); *G01S 13/89* (2013.01)

(58) Field of Classification Search
  CPC ........... G01S 13/12; G01S 7/282; G01S 13/89
  See application file for complete search history.

(56) References Cited

U.S. PATENT DOCUMENTS

| | | | |
|---|---|---|---|
| 4,249,174 A | 2/1981 | Lucchi et al. | |
| 4,649,388 A * | 3/1987 | Atlas | G01S 13/951 |
| | | | 342/26 D |
| 7,242,343 B1 * | 7/2007 | Woodell | G01S 7/41 |
| | | | 342/26 B |
| 7,307,576 B1 | 12/2007 | Koenigs | |
| 7,714,767 B1 * | 5/2010 | Kronfeld | G01W 1/10 |
| | | | 342/26 B |
| 9,869,766 B1 | 1/2018 | Breiholz et al. | |
| 10,605,912 B1 * | 3/2020 | Godfrey | G01S 13/953 |
| 2011/0018757 A1 * | 1/2011 | Mizutani | G01S 7/025 |
| | | | 342/26 R |
| 2013/0106832 A1 * | 5/2013 | Meeker | G01C 21/3638 |
| | | | 345/428 |

FOREIGN PATENT DOCUMENTS

EP  0562027 B1  10/1995
JP  1990047711 B2  10/1990

* cited by examiner

*Primary Examiner* — Peter M Bythrow
*Assistant Examiner* — Nazra Nur Waheed
(74) *Attorney, Agent, or Firm* — Suiter Swantz pc llo

(57) ABSTRACT

A radar system receives threat relevant data with pulses sufficiently separated to provide sufficient long-range imaging, analyzes the return data to identify features of the threat, and generate a second set of pulses to acquire more detailed, higher granularity data specific to the threat. The system may include an ESA that is configured for pulses in a higher frequency to acquire higher resolution data specific to the threat.

20 Claims, 4 Drawing Sheets

```
PERFORM RADAR IMAGING AT A FIRST PULSE SEPARATION
                    |
ANALYZE RETURN DATA TO IDENTIFY THREAT FEATURES
                    |
DETERMINE A BEAM CONFIGURATION BASED ON THE ANALYSIS
                    |
PERFORM RADAR IMAGING AT A SECOND PULSE SEPARATION
```

ADAPTIVE CELL DEPTH CONTOUR BEAMS

BACKGROUND

Current radar beam scans used to detect weather at mid to long ranges are segmented with large gaps between data points. These large gaps in data result in lower resolution and accuracy of weather threats, complicating flight planning. This lower resolution data also limits display options and blending as data close to the aircraft is at a much higher resolution then the data at longer ranges. Gaps in the cell data can also cause blinking and fading of weather cells across the horizon. However, large gaps at mid to long-range are necessary to provide sufficient imaging range. It would be advantageous to have a system that maintains imaging range but provides high threat specific resolution.

SUMMARY

In one aspect, embodiments of the inventive concepts disclosed herein are directed to a radar system that receives threat relevant data with pulses sufficiently separated to provide sufficient long-range imaging, analyzes the return data to identify features of the threat, and generate a second set of pulses to acquire more detailed, higher granularity data specific to the threat.

In a further aspect, the system may include an electronically scanned array (ESA). The ESA can be configured for pulses in a higher frequency to acquire higher resolution data specific to the threat.

Dynamically adjustable pulse widths increase weather event resolution allowing for better predictions of cell growth and decay. An initial set of scans at a fixed pulse width are performed to determine the rough contours and storm top heights of all the weather events in view. The contours of the cell are then used to shorten the pulse widths so that more data points are collected within the weather cells versus the empty space surrounding the cells. The radar would alternate between traditional beams and adaptive depth contour beams.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
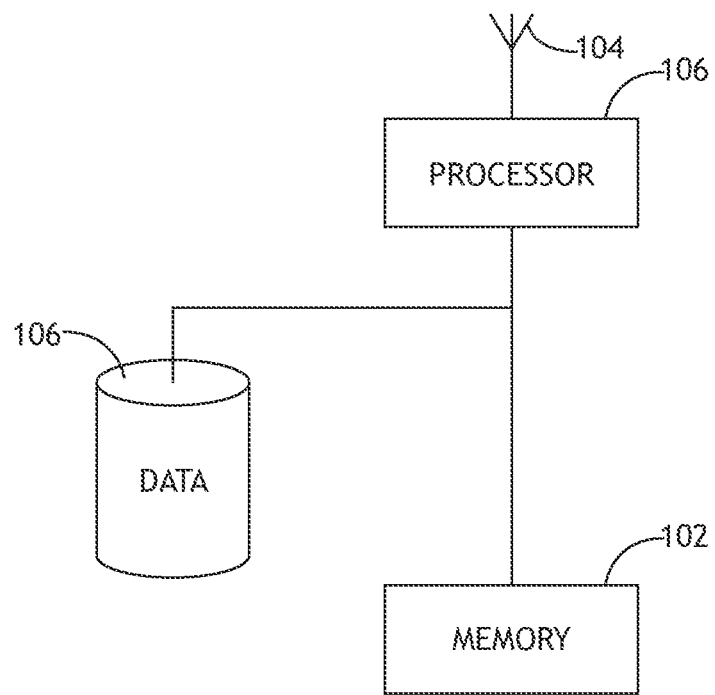
FIG. 1 shows a block view of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system that receives threat relevant data with pulses sufficiently separated to provide sufficient long-range imaging, analyzes the return data to identify features of the threat, and generate a second set of pulses to acquire more detailed, higher granularity data specific to the threat. The system may include an ESA. The ESA can be configured for pulses in a higher frequency to acquire higher resolution data specific to the threat.

Referring to FIG. 1, a block view of a system for implementing an exemplary embodiment is shown. The system includes a processor 100, memory 102 connected to the processor 100 for embodying processor executable code, and one or more antennas 104 connected to the processor.

The system, which may be embodied in an aircraft radar system, produces pulses from the antenna 104 and receives return signals to create a radar image of weather events or other threats within an operating range of the system. The range of the system is at least partially defined by the gap between pulses. The gap between pulses limits the resolution of the resulting image: narrower pulse widths would allow for higher resolution scans but would limit the range of the system.

In at least one embodiment, the processor 100 is configured to produce pulses via the antenna 104, receive return pulses, and process the return pulses to identify weather events within range. Characteristics of each weather event are identified, such as the general contours of each weather event as determinable within the resolution available, and the size of the weather event, both horizontally and vertically.

Based on the size and contours of the weather event, the processor 100 determines a second set of pulses with a narrower pulse width. The extent or duration of the narrower pulse width is a function of the identified characteristics to maximize the potential resolution of the resulting image for the specific weather event. For example, pulse widths may be set based on the minimum and maximum range of a weather event. Furthermore, pulse widths may be set based on the height or width of the weather event. Narrower pulse widths provide higher resolution information about the weather event. In at least one embodiment, the processor 100 is configured to identify return signal data corresponding to the specific weather event from the second set of pulses and discards other return data which may include unusable data because of the specific configuration of the second set of pulses.

In at least one embodiment, multiple weather events with different characteristics may be identified during the initial imaging. Multiple set of following pulses may be defined based on the different identified characteristics of each weather event, and the resulting higher resolution images may be stored in a data storage element 106 and combined to produce a single high resolution radar image. The process may periodically repeat to maintain current, high-resolution data of surrounding weather events while still maintaining an up-to-date long-range image.

In at least one embodiment, the antenna 104 may comprise an ESA. In addition to determining different pulse widths based on the characteristics of weather events, the processor 100 may determine a frequency for the second set of pulses to further enhance the resulting image resolution (higher frequency signals providing higher resolution return pulses). Furthermore, signal pulse may be configured with specific polarization to more easily discern weather event characteristics specific to horizontal or vertical aspects of the weather event.

Figure 2:
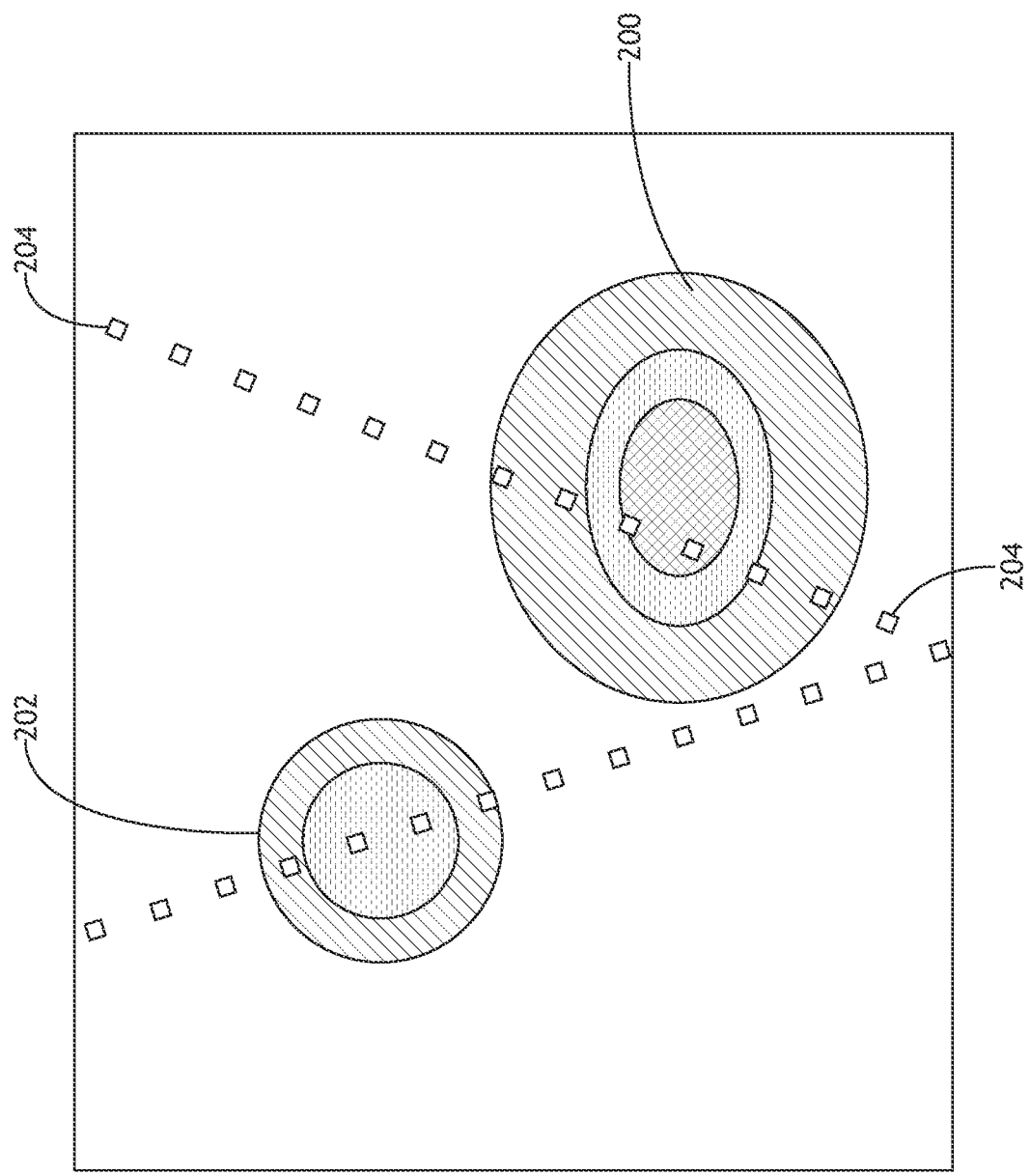
FIG. 2 shows a block representation of a phase of radar imaging according to an exemplary embodiment.

Referring to FIG. 2, a block representation of a phase of radar imaging according to an exemplary embodiment is shown. During normal radar imaging, weather events 200, 202 are scanned via radar signal pulses 204 that produce return signals providing information about each weather event 200, 202. The resolution of such information is a function of the frequency of the signals and pulse width. Such resolution is generally sufficient to identify the height and width of each weather event 200, 202, and contours of each weather event 200, 202 down to some minimum threshold.

Figure 3:
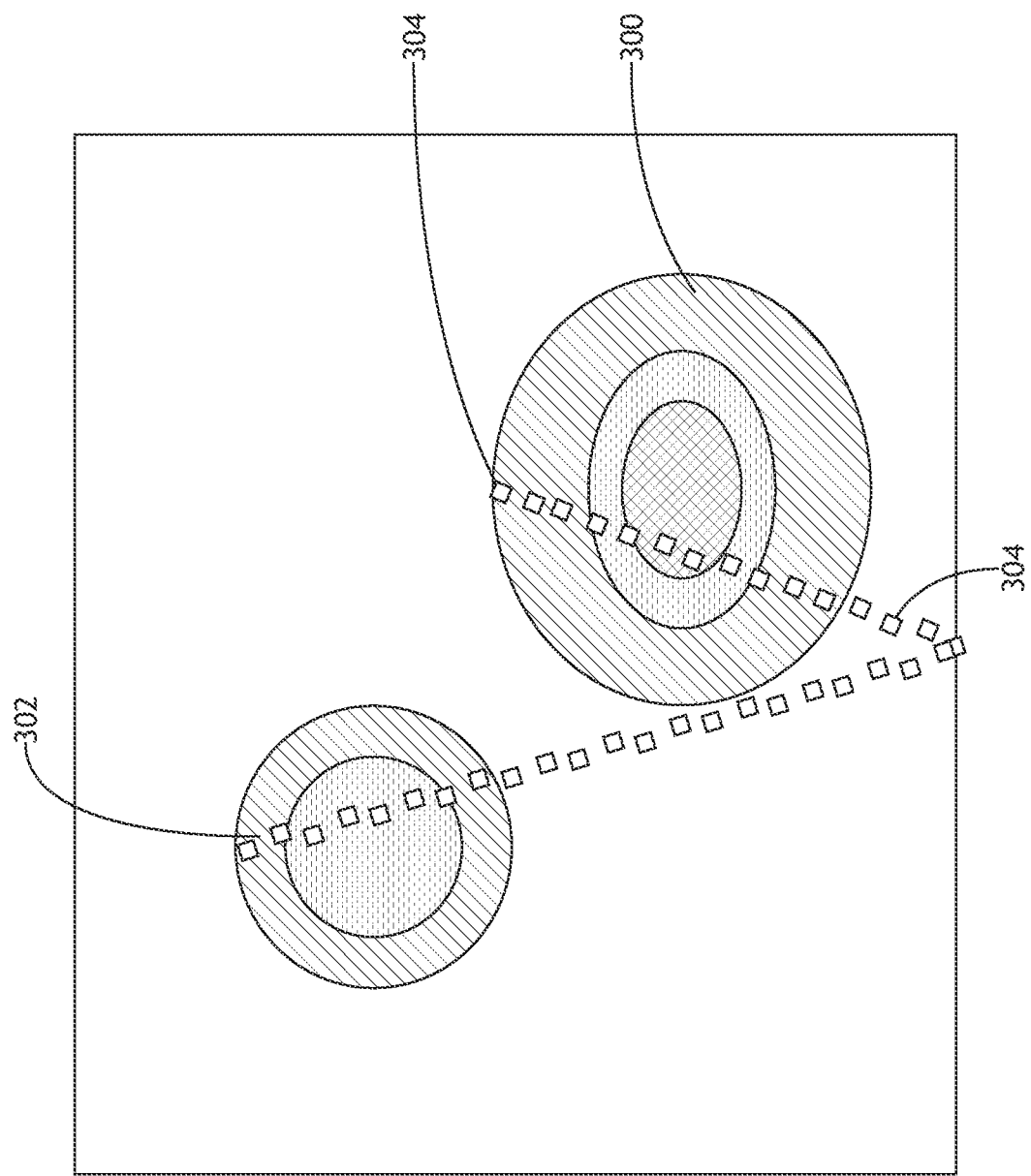
FIG. 3 shows a block representation of a phase of imaging according to an exemplary embodiment.

Referring to FIG. 3, a block representation of a phase of imaging according to an exemplary embodiment is shown. During a subsequent radar imaging phase, specific characteristics of each weather event 200, 202 are identified from the first, normal radar imaging phase, including the heights, widths, and contours of each weather event 200, 202. Based on those characteristics, a second set of radar pulses 304, 306 is configured with a pulse width sufficient to scan each weather event 200, 202 with higher resolution as compared to the normal radar imaging phase. The weather events 200, 202 are then scanned with the second set of radar pulses 304, 306 and a higher resolution image of each weather event 200, 202 is produced.

In at least one embodiment, individual weather events 200, 202 may have different characteristics, indicating different characteristics for follow-up radar pulses 304, 306 to maximize resolution. A first weather event 200 may be scanned in the subsequent phase via radar pulses 304 defined by the specific characteristics of the first weather event 200, while a second weather event 202 is scanned in the subsequent phase via radar pulses 306 defined by the specific characteristics of the second weather event 202.

In at least one embodiment, the higher resolution follow-up scans may be combined with the initial, normal scan to produce a composite image of the highest resolution data available. In at least one embodiment, higher resolution scans may replace lower resolution data in the initial scan. Alternatively higher resolution data may be used to interpolate data points missing from the initial scan to create a blended image. In such embodiments, interpolated may be carried over into subsequent normal pulse width scan phases.

Figure 4:
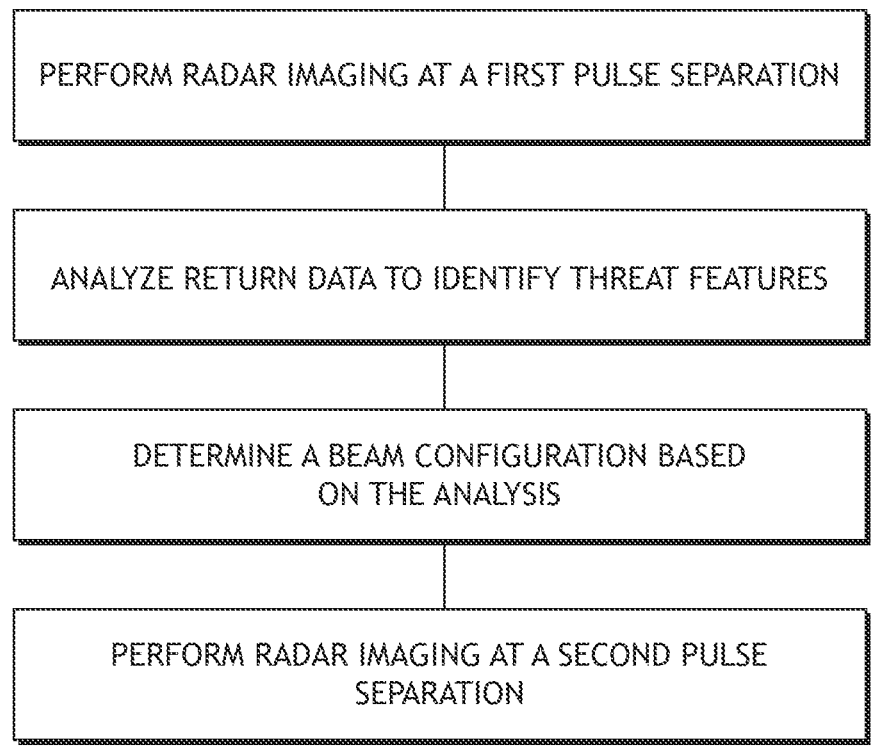
FIG. 4 shows a flowchart of a method according to an exemplary embodiment.

Referring to FIG. 4, a flowchart of a method according to an exemplary embodiment is shown. A radar system performs 400 an initial radar imaging with a beam configured for a first pulse width defined by a maximum desired imaging range. The return signals are analyzed 402 to identify weather events within the imaging range. The height, width, and contours of those identified weather events are determined from the initial radar imaging and characteristics for one or more follow-up beams are determined 404 based on the identified height, width, and contours. The follow-up beams are then generated, and return signals received, to perform 406 a second, higher resolution radar imaging. The resulting disparate radar images are then integrated.

For a radar, pulse pattern is the foundation that enables various capabilities. By adapting the pulse pattern to the environment, the performance of the radar is enhanced by providing higher resolution data to the flight deck and thereby improving safety. In addition to traditional weather radar applications, embodiments may be useful when using an ESA to detect various other targets such as terrain, traffic, etc. This can enable a multi-use radar.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor in data communication with a memory storing processor executable code for configuring the at least one processor to:
perform a first radar imaging step with a first beam having a first pulse width;
identify one or more weather events from the first radar imaging step;
determine size and contours of each of the one or more weather events based on the first radar imaging step;
determine a second beam having a polarization distinct from the first beam and a second pulse width based on the determined size and contours to provide higher resolution data from the one or more weather events as compared to the first beam; and
perform a second radar imaging step with the second beam,
wherein the second pulse width is defined by a maximum range encompassing the size and contours, and the polarization is configured to discern specific horizontal or vertical aspects of the one or more weather events.

2. The computer apparatus of claim 1, wherein the at least one processor is further configured to combine return data from the second radar imaging step with return data from the first radar imaging step.

3. The computer apparatus of claim 2, wherein combining return data from the second radar imaging step with return data from the first radar imaging step comprises replacing data in the first radar imaging step with data from the second radar imaging step for portions of the first radar imaging step corresponding to the one or more weather events.

4. The computer apparatus of claim 2, wherein combining return data from the second radar imaging step with return data from the first radar imaging step comprises interpolating data in the first radar imaging step with data from the second radar imaging step for portions of the first radar imaging step corresponding to the one or more weather events.

5. The computer apparatus of claim 1, wherein:
the first beam comprises a first frequency; and
determining the second beam comprises identifying a second frequency based on the determined size and contours.

6. The computer apparatus of claim 1, wherein:
the second beam is based on the determined size and contours of a first weather event; and
the at least one processor is further configured to:
determine a third beam having a third pulse width based on the determined size and contours of a second weather event.

7. The computer apparatus of claim 1,
wherein the at least one processor is further configured to:
identify return data of the second radar imaging beam not associated with the one or more weather events; and
discard the identified return data.

8. A method comprising:
performing a first radar imaging step with a first beam having a first pulse width;
identifying one or more weather events from the first radar imaging step;
determining size and contours of each of the one or more weather events based on the first radar imaging step;
determining a second beam having a polarization distinct from the first beam and a second pulse width based on the determined size and contours to provide higher resolution data from the one or more weather events as compared to the first beam; and
performing a second radar imaging step with the second beam,
wherein the second pulse width is defined by a maximum range encompassing the size and contours, and the polarization is configured to discern specific horizontal or vertical aspects of the one or more weather events.

9. The method of claim 8, further comprising combining return data from the second radar imaging step with return data from the first radar imaging step.

10. The method of claim 9, wherein combining return data from the second radar imaging step with return data from the first radar imaging step comprises replacing data in the first radar imaging step with data from the second radar imaging step for portions of the first radar imaging step corresponding to the one or more weather events.

11. The method of claim 9, wherein combining return data from the second radar imaging step with return data from the first radar imaging step comprises interpolating data in the first radar imaging step with data from the second radar imaging step for portions of the first radar imaging step corresponding to the one or more weather events.

12. The method of claim 8, wherein:
the first beam comprises a first frequency; and
determining the second beam comprises identifying a second frequency based on the determined size and contours.

13. The method of claim 8, wherein:
the second beam is based on the determined size and contours of a first weather event; and
further comprising:
determining a third beam having a third pulse width based on the determined size and contours of a second weather event.

14. The method of claim 8, further comprising:
identifying return data of the second radar imaging beam not associated with the one or more weather events; and
discarding the identified return data.

15. A system comprising:
an antenna;
at least one processor in data communication with the antenna and a memory storing processor executable code for configuring the at least one processor to:
perform a first radar imaging step with a first beam having a first pulse width;
identify one or more weather events from the first radar imaging step;
determine size and contours of each of the one or more weather events based on the first radar imaging step;
determine a second beam having a polarization distinct from the first beam and a second pulse width based on the determined size and contours to provide higher resolution data from the one or more weather events as compared to the first beam; and
perform a second radar imaging step with the second beam,
wherein the second pulse width is defined by a maximum range encompassing the size and contours, and the polarization is configured to discern specific horizontal or vertical aspects of the one or more weather events.

16. The system of claim 15, wherein the at least one processor is further configured to combine return data from the second radar imaging step with return data from the first radar imaging step.

17. The system of claim 16, wherein combining return data from the second radar imaging step with return data from the first radar imaging step comprises replacing data in the first radar imaging step with data from the second radar imaging step for portions of the first radar imaging step corresponding to the one or more weather events.

18. The system of claim 16, wherein combining return data from the second radar imaging step with return data from the first radar imaging step comprises interpolating data in the first radar imaging step with data from the second radar imaging step for portions of the first radar imaging step corresponding to the one or more weather events.

19. The system of claim 15, wherein:
the antenna comprises an electronically scanned array (ESA);
the first beam comprises a first frequency; and
determining the second beam comprises identifying a second frequency based on the determined size and contours.

20. The system of claim 15, wherein:
the second beam is based on the determined size and contours of a first weather event; and
the at least one processor is further configured to:
  determine a third beam having a third pulse width based on the determined size and contours of a second weather event.

* * * * *